United States Patent
Sa et al.

(10) Patent No.: US 11,325,988 B2
(45) Date of Patent: May 10, 2022

(54) SULFUR-CROSSLINKABLE RUBBER MIXTURE, VULCANIZATE OF THE RUBBER MIXTURE, AND VEHICLE TIRE

(71) Applicant: Continental Reifen Deutschland GmbH, Hannover (DE)

(72) Inventors: Catarina Sa, Isernhagen (DE); Gesa Tarantola, Hannover (DE); Viktoria Pavon Sierra, Hannover (DE); Armand Gabriel Becheanu-Boeke, Lauenau (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 16/767,233

(22) PCT Filed: Oct. 16, 2018

(86) PCT No.: PCT/EP2018/078135
§ 371 (c)(1),
(2) Date: May 27, 2020

(87) PCT Pub. No.: WO2019/110176
PCT Pub. Date: Jun. 13, 2019

(65) Prior Publication Data
US 2020/0377623 A1 Dec. 3, 2020

(30) Foreign Application Priority Data
Dec. 5, 2017 (DE) .................... 10 2017 221 863.0

(51) Int. Cl.
C08C 19/20 (2006.01)
B60C 1/00 (2006.01)
C08C 19/25 (2006.01)
C08K 3/36 (2006.01)

(52) U.S. Cl.
CPC ............ C08C 19/20 (2013.01); B60C 1/0016 (2013.01); C08C 19/25 (2013.01); C08K 3/36 (2013.01)

(58) Field of Classification Search
CPC ....... C08C 19/20; C08C 19/25; B60C 1/0016; C08K 3/36
See application file for complete search history.

(56) References Cited

U.S. PATENT DOCUMENTS

| 4,840,988 | A | 6/1989 | Nakayama et al. |
| 8,252,863 | B2 | 8/2012 | Hasse et al. |
| 2002/0082333 | A1 | 6/2002 | Herpich et al. |
| 2003/0195289 | A1 | 10/2003 | Heiliger et al. |
| 2009/0137701 | A1 | 5/2009 | Hirabayashi |
| 2009/0137718 | A1 | 5/2009 | Hirabayashi |
| 2014/0121316 | A1 | 5/2014 | Monsallier et al. |
| 2014/0171557 | A1* | 6/2014 | Ringot ............... C08L 9/06 524/83 |

FOREIGN PATENT DOCUMENTS

| DE | 3804908 A1 | 8/1988 |
| DE | 102006004062 A1 | 8/2007 |
| DE | 102008058991 A1 | 6/2009 |
| DE | 102008058996 A1 | 6/2009 |
| DE | 102015218745 A1 | 3/2017 |
| EP | 1035164 A1 | 9/2000 |
| EP | 1052270 A1 | 11/2000 |
| EP | 2060604 A1 | 5/2009 |
| EP | 2098384 A1 | 9/2009 |
| EP | 2345696 A1 | 7/2011 |
| EP | 2589619 A1 | 5/2013 |
| JP | 2003327755 A | 11/2003 |
| JP | 2006063209 A | 3/2006 |
| JP | 2007284645 A | 11/2007 |
| JP | 2015083649 A | 4/2015 |
| JP | 2016060810 A | 4/2016 |
| JP | 2016180649 A1 | 10/2016 |
| WO | 9909036 A1 | 2/1999 |
| WO | 2008083241 A2 | 7/2008 |
| WO | 2008083242 A1 | 7/2008 |
| WO | 2008083243 A1 | 7/2008 |
| WO | 2008083244 A1 | 7/2008 |

OTHER PUBLICATIONS

Derwent Abstract for DE 102015218745 (Year: 2015).*
English language machine translation of DE 102015218745 (Year: 2017).*
International Search Report dated Feb. 1, 2019 of International Application PCT/EP2018/078135 which this application is based on.

* cited by examiner

Primary Examiner — Angela C Scott
(74) Attorney, Agent, or Firm — David L. Cate; Gregory Adams

(57) ABSTRACT

A sulfur-crosslinkable rubber mixture comprising at least the following constituents:
   at least one diene rubber and
   at least one liquid, linear modified diene polymer A, modified with a functional group of formula I) at only one chain end, the number of functional groups per molecule being on average from 0.8 to 1

$(R^1R^2R^3)Si—X—NH—C(=O)—O—$,    I)

where $R^1$, $R^2$ and $R^3$ independently of one another are selected from methoxy groups, ethoxy groups, phenoxy groups, methyl groups, ethyl groups and phenyl groups, with in each case at least one of the groups $R^1$, $R^2$ and $R^3$ being a methoxy group, an ethoxy group or a phenoxy group, and where X is a divalent alkyl group having 1 to 6 carbon atoms.

10 Claims, No Drawings

SULFUR-CROSSLINKABLE RUBBER MIXTURE, VULCANIZATE OF THE RUBBER MIXTURE, AND VEHICLE TIRE

The invention relates to a sulfur-crosslinkable rubber mixture, the vulcanizate thereof, and a vehicle tire.

Since the running properties of a tire, especially of a pneumatic vehicle tire, depend to a great extent on the rubber composition of the tread, particularly high demands are placed on the composition of the tread mixture. The partial or complete replacement of the carbon black filler with silica in rubber mixtures has brought the running properties to a higher level overall over the past few years. However, the known conflicting objectives in terms of the contrary tire properties also continue to exist with silica-containing tread mixtures. For instance, an improvement in wet grip still generally entails a deterioration in rolling resistance, in winter properties and in abrasion characteristics. At the same time, depending on the alteration of the mixture, there is likewise a deterioration in the dry braking characteristics, which are by and large independent of the conflict of objectives between rolling resistance and wet braking.

In order to resolve the conflicts of objectives in the tread, a variety of approaches have already been pursued. For example, a wide variety of different polymers, including modified polymers, resins, plasticizers and finely divided fillers have been used for rubber mixtures, and attempts have been made to influence the vulcanizate properties by modification of the mixture production.

EP 1052270 A discloses, for example, tread mixtures based on carbon black as filler, which for effective grip on ice include among other components a liquid polymer, e.g. polybutadiene.

DE 3804908 A1 likewise discloses tread mixtures based on carbon black as filler, which comprise liquid polybutadiene for good winter properties.

Liquid polybutadiene having a high vinyl content and a high glass transition temperature ($T_g$) is proposed in EP 1035164 A for tire treads as a substitute for conventional plasticizer oils.

DE 102008058996 A1 and DE102008058991 A1 disclose, as a substitute for customary plasticizer oils, terminally amine-modified liquid polybutadienes or terminally carboxyl-modified liquid polybutadienes in tread mixtures having a high amount of synthetic rubber. The tires are said to feature a very good balance between low fuel consumption and good adhesion properties, and the ability to suppress cracking at the base of profile grooves while simultaneously maintaining wear resistance.

EP 2060604 B1 discloses a rubber mixture comprising a functionalized polymer having an Mw of 20 000 g/mol and carbon black as filler in combination with 60 phr of natural rubber.

US 20020082333 A1 improves processability by using a triethoxysilane-modified polybutadiene rather than a silane in an NR-free rubber mixture based on synthetic rubber and silica as filler.

The use of modified liquid polybutadiene, known in the prior art, for improving the properties is, however, very detrimental to the braking characteristics, particularly the dry braking, of tires.

It is an object of the present invention, then, to provide a rubber mixture which in comparison to the prior art shows an improvement in the conflict of objectives between rolling resistance and wet braking characteristics, and does so without impairing the dry braking characteristics. At the same time, the other properties, such as the tensile properties, for example, are to remain at a comparable level or even likewise be improved. This object is achieved by means of a sulfur-crosslinkable rubber mixture comprising at least the following constituents:
- at least one diene rubber and
- at least one liquid linear modified diene polymer A, modified with a functional group of formula I) at only one chain end, the number of functional groups per molecule being on average from 0.8 to 1

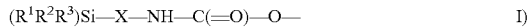

$(R^1R^2R^3)Si$—X—NH—C(=O)—O—   I)

where $R^1$, $R^2$ and $R^3$ independently of one another are selected from methoxy groups, ethoxy groups, phenoxy groups, methyl groups, ethyl groups and phenyl groups, with in each case at least one of the groups $R^1$, $R^2$ and $R^3$ being a methoxy group, an ethoxy group or a phenoxy group, and where X is a divalent alkyl group having 1 to 6 carbon atoms.

The liquid linear modified diene polymer A is also referred to in the context of the present invention, in abbreviated form, as "liquid polymer A" or "polymer A".

Surprisingly it has emerged that with a liquid polymer A in the rubber mixture, a higher level is achieved in terms of the conflict of objectives between rolling resistance characteristics and wet braking characteristics. At the same time, surprisingly, the rubber mixture has significantly improved dry braking characteristics.

A further subject of the present invention is a vulcanizate of at least one rubber mixture of the invention.

A further subject of the present invention is a vehicle tire which comprises at least one vulcanizate of the invention of the rubber mixture of the invention in at least one component. The vehicle tire preferably has the at least one vulcanizate at least in the tread.

The vulcanizate of the invention and the vehicle tire of the invention are situated at a higher level in terms of the conflict of objectives between rolling resistance and wet braking characteristics and are improved in terms of dry braking.

In the case of two-part treads (upper part: cap and lower part: base), the rubber mixture of the invention can be used both for the cap and for the base. Preferably, at least the cap or at least the base, or at least the cap and the base, has/have at least one vulcanizate of the invention of the rubber mixture of the invention.

The rubber mixture of the invention is additionally also suitable for treads consisting of various tread mixtures arranged alongside one another and/or one on top of another (multicomponent tread).

In the context of the present invention, vehicle tires are understood to mean pneumatic vehicle tires and solid rubber tires, including tires for industrial and construction site vehicles, and truck, car and two-wheeler tires.

The rubber mixture of the invention is in addition also suitable for other components of vehicle tires, for example in particular the flange profile, and also for inner tire components.

The rubber mixture according to the invention is in addition also suitable for other technical rubber articles, such as bellows, conveyor belts, air springs, belts, drive belts or hoses, and also shoe soles.

There follows a detailed description of the constituents of the sulfur-crosslinkable rubber mixture according to the invention. All of the observations are equally valid for the vulcanizate of the invention and for the vehicle tire of the invention, comprising at least one vulcanizate of the invention of the rubber mixture of the invention in at least one component.

Essentially to the invention, the sulfur-crosslinkable rubber mixture comprises at least one liquid linear modified diene polymer A, preferably in amounts of 1 to 80 phr, more preferably 5 to 50 phr, very preferably 10 to 40 phr.

The unit "phr" (parts per hundred parts of rubber by weight) used in this document is the standard unit of amount for blend recipes in the rubber industry. The dosage of the parts by weight of the individual substances is based in this document on 100 parts by weight of the total mass of all high molecular mass and hence solid, non-liquid, rubbers present in the mixture.

A "liquid polymer" for the purposes of the present invention is a polymer which at 25° C. has a Brookfield method (method according to DIN EN ISO 2555) viscosity of not more than 30 000 mPas, more particularly of 500 to 30 000 mPas.

Preferably the liquid polymer A at 25° C. has a viscosity of 3000 mPas to 30 000 mPas, more preferably 3000 to 15 000 mPas, very preferably 3000 to 10 000 mPas.

The liquid polymer A present in accordance with the invention, and also, where appropriate, other liquid polymers, present as plasticizers, have more particularly a weight-average Mw of the molecular weight of less than 20 000 g/mol and are not included as rubbers in the one hundred parts of the phr calculation.

The weight-average Mw and number-average Mn molecular weights of the polymers are determined by gel permeation chromatography (GPC with tetrahydrofuran (THF) as eluent at 40° C. and a flow rate of 1.0 mL/min and also with a sample concentration of 5 mg/10 mL, reference polystyrene standard; instrument "GPC 8020" and detector: "RI-8020" manufactured by Tosoh Corporation).

In the context of the present invention, the abbreviation Mw is used for the weight-average molecular weight.

The polymer A preferably has a weight-average Mw molecular weight by GPC of 500 to 15 000 g/mol, preferably 5000 to 15 000 g/mol, more preferably 5200 to 15 000 g/mol, very preferably 5200 to 10 000 g/mol.

With this, particularly good properties are achieved by the rubber mixture of the invention and the vehicle tire of the invention, particularly with regard to the rolling resistance and dry braking properties in conjunction with optimized wet braking characteristics.

The polymer A present in accordance with the invention preferably has an Mw/Mn ratio of 1.0 to 2.0, more preferably 1.0 to 1.6, very preferably 1.0 to 1.4.

These ratios of Mw/Mn are advantageous since they imply a small variance in the viscosity.

The liquid, linear modified diene polymer A is modified with a functional group of formula I) at only one chain end, with the number of functional groups per molecule being on average from 0.8 to 1.

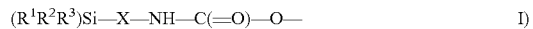

$(R^1R^2R^3)Si-X-NH-C(=O)-O-$  I)

where $R^1$, $R^2$ and $R^3$ independently of one another are selected from methoxy groups, ethoxy groups, phenoxy groups, methyl groups, ethyl groups and phenyl groups, with in each case at least one of the groups $R^1$, $R^2$ and $R^3$ being a methoxy group, an ethoxy group or a phenoxy group, and where X is a divalent alkyl group having 1 to 6 carbon atoms.

The modification of the chain end of a polymer chain is also referred to as "terminal modification".

The functional group of formula I) here is bonded to the polymer chain via the oxygen atom (O—), and so the terminally modified polymer is then $(R^1R^2R^3)Si-X-NH-C(=O)-O-$ polymer chain.

In contrast to siloxane-modified polymers known from the prior art, the polymer A is modified at most only at each chain end with said group according to formula I). The polymer chains of the polymer A are not modified at both chain ends.

Here, certain polymer chains may also be entirely unmodified, thus producing a degree of functionalization of less than 1 on average within the mixture of a multiplicity of polymer chains. In accordance with the invention, for the polymer A present in the rubber mixture, 80% to 100% of the polymer chains are modified at one chain end, thus producing values of 0.8 to 1 on average for the number of functional groups per molecule.

Surprisingly, the rubber mixture of the invention comprising at least one polymer A with the degree of functionalization of 0.8 to 1 exhibits significantly improved dry braking characteristics by comparison with a rubber mixture not of the invention, comprising a polymer modified at both chain ends.

In the case of an average number of functional groups of less than 0.8, the interaction between filler(s) and the linear modified polymer A is poorer, and so the crosslinked rubber mixtures do not exhibit sufficient improvements in properties.

In the case of an average number of functional groups of greater than 1—as would be the case if the functional group were not present at only one chain end—the improvement in properties would likewise be impaired by excessive interaction between filler and linear polymer A. The number of functional groups per molecule is preferably 0.85 to 1, more preferably 0.9 to 1.

The number of functional groups per molecule in the linear modified polymer A may be calculated via $^1$H-NMR (500 MHz; concentration of sample/CDCl$_3$ 50 mg/1 L, number of recordings 1024) on the basis of the peaks based on the polymerization initiators (unmodified chain end) and on a urethane bond (modified chain end) (calculation on the basis of the area ratios).

The group X is preferably a divalent alkyl group having 2 to 4 carbon atoms and more preferably having 3 carbon atoms, and is therefore preferably a divalent propyl radical. A propyl radical may be an n-propyl group or an isopropyl group. This produces particularly good properties in the rubber mixture and in the vehicle tire, particularly with regard to the dry braking characteristics.

According to advantageous embodiments, the radicals $R^1$, $R^2$ and $R^3$ are identical within one molecule.

According to one advantageous embodiment, the radicals $R^1$, $R^2$ and $R^3$ are ethoxy groups. According to one advantageous embodiment, the radicals $R^1$, $R^2$ and $R^3$ are methoxy groups.

With particular preference, X here is an n-propyl group or an isopropyl group, preferably an n-propyl group.

The polymer A is based on the polymerization of conjugated dienes, where in particular a linear unmodified polymer A' is based, as precursor for the modified polymer A, on monomers for polymerization that comprise monomers of at least one kind of conjugated diene.

Included as diene is in principle any conjugated diene known to the skilled person, such as, in particular, butadiene and isoprene.

Further conjugated dienes are, for example, 2,3-dimethylbutadiene, 2-phenylbutadiene, 1,3-pentadiene, 2-methyl- 1,3-pentadiene, 1,3-hexadiene, 1,3-octadiene, 1,3-cyclohexadiene, 2-methyl-1,3-octadiene, 1,3,7-octatriene, myrcene and chloroprene.

The polymerization is based preferably on butadiene and/or isoprene monomers. According to one preferred embodiment of the invention, the unmodified polymer A' comprises butadiene and/or isoprene monomers in a weight fraction of greater than or equal to 50% by weight, preferably 60% to 100% by weight, more preferably 70% to 100% by weight, based on the weight of the unmodified polymer A'.

Further, the linear diene polymer A' and, respectively, the linear terminally modified polymer A may comprise further monomers, such as, in particular, aromatic vinyl compounds.

Examples of aromatic vinyl compounds are, in particular, styrene, α-methylstyrene (alpha-methylstyrene), 2-methylstyrene, 3-methylstyrene, 4-methylstyrene, 4-propylstyrene, 4-tert-butylstyrene, 4-cyclohexylstyrene, 4-dodecylstyrene, 2,4-dimethylstyrene, 2,4-diisopropylstyrene, 2,4,6-trimethylstyrene, 2-ethyl-4-benzylstyrene, 4-(phenylbutyl)styrene, 1-vinylnaphthalene, 2-vinylnaphthalene, vinylanthracene, N,N-diethyl-4-aminoethylstyrene, vinylpyridine, 4-methoxystyrene, monochlorostyrene, dichlorostyrene and divinylbenzene. Preferred among the aromatic vinyl compounds are styrene, α-methylstyrene and 4-methylstyrene.

Where the linear unmodified polymer A' comprises monomers other than butadiene and isoprene, the weight fractions thereof, based on the weight of the linear unmodified polymer A', is not more than 50%, preferably not more than 40% by weight, more preferably not more than 30% by weight. For example, the rolling resistance characteristics of crosslinked rubber mixtures comprising the modified polymer A are improved if aromatic vinyl compounds are included as monomers in the stated weight ratio in the unmodified polymer A'.

According to one particularly advantageous embodiment of the invention, the polymer A is a polybutadiene. In accordance with this embodiment it is preferred for the unmodified polymer A' to be composed 100 mol % of butadiene monomers.

The liquid polymer A preferably has a vinyl content of not more than 90 mol %, more preferably not more than 85 mol %, and very preferably not more than 80 mol %. The vinyl content, moreover, is preferably not less than 0.5 mol %, more preferably not less than 1 mol %. For the purposes of the present invention, the "vinyl content" refers to the total molar fraction of the conjugated diene units which are joined to one another via 1,2-bridges or 3,4-bridges in 100 mol % of isoprene units, butadiene units or monomer units other than isoprene and butadiene that are present. The vinyl content may be determined via $^1$H-NMR on the basis of the peaks for 1,2-bonds or 3,4-bonds relative to 1,4-bonds. According to advantageous embodiments, the liquid polymer A has a vinyl content of 40 to 80 mol %, more preferably 50 to 70 mol %, very preferably 55 to 70 mol %, more particularly 60 to 65 mol %.

The liquid polymer A preferably has a glass transition temperature $T_g$ by DSC (differential scanning calorimetry; measurement from +70° C. to −150° C., temperature change of 10 K/min; determination of the glass transition point from the peak of the DDSC (derived DSC)) from −150 to +50° C., more preferably −130 to +50° C., very preferably −130 to +30° C. (plus 30), in turn preferably −85 to −30° C. (minus 30), in turn very preferably −60 to −40° C., more particularly −55 to −45° C. This gives rise to particularly good rolling resistance indicators.

In accordance with the invention, the rubber mixture is sulfur-crosslinkable and for that purpose includes at least one diene rubber. Diene rubbers are rubbers formed by polymerization or copolymerization of dienes and/or cycloalkenes and thus have C=C double bonds either in the main chain or in the side groups.

The diene rubber is preferably selected from the group consisting of natural polyisoprene and/or synthetic polyisoprene and/or epoxidized polyisoprene and/or butadiene rubber and/or butadiene-isoprene rubber and/or solution-polymerized styrene-butadiene rubber and/or emulsion-polymerized styrene-butadiene rubber and/or styrene-isoprene rubber and/or liquid rubbers having a molecular weight M. of greater than 20 000 g/mol and/or halobutyl rubber and/or polynorbornene and/or isoprene-isobutylene copolymer and/or ethylene-propylene-diene rubber and/or nitrile rubber and/or chloroprene rubber and/or acrylate rubber and/or fluoro rubber and/or silicone rubber and/or polysulfide rubber and/or epichlorohydrin rubber and/or styrene-isoprene-butadiene terpolymer and/or hydrogenated acrylonitrile-butadiene rubber and/or hydrogenated styrene-butadiene rubber.

Nitrile rubber, hydrogenated acrylonitrile-butadiene rubber, chloroprene rubber, butyl rubber, halobutyl rubber or ethylene-propylene-diene rubber in particular are employed in the production of technical rubber articles, such as belts, drive belts and hoses, and/or shoe soles.

The rubber mixture is suitable in particular for vehicle tires, and here it may be used in principle in any component, such as, in particular, in the tread, in the sidewall, in the flange profile, and also in other so-called body components.

The diene rubber is preferably selected from the group consisting of natural polyisoprene (NR), synthetic polyisoprene (IR), butadiene rubber (BR), solution-polymerized styrene-butadiene rubber (SSBR), emulsion-polymerized styrene-butadiene rubber (ESBR), butyl rubber (IIR) and halobutyl rubber.

According to one particularly preferred embodiment of the invention, the diene rubber is selected from the group consisting of natural polyisoprene (NR), synthetic polyisoprene (IR), butadiene rubber (BR), solution-polymerized styrene-butadiene rubber (SSBR) and emulsion-polymerized styrene-butadiene rubber (ESBR). A rubber mixture of this kind is especially suitable for the tread of vehicle tires.

According to one particularly advantageous embodiment of the invention, the rubber mixture comprises at least one natural polyisoprene, preferably in amounts of 2 to 100 phr, and according to one particularly advantageous embodiment of the invention 5 to 30 phr, very preferably 5 to 20 phr. Particularly good processability of the rubber mixture of the invention is achieved in this way.

According to one particularly advantageous embodiment of the invention, the rubber mixture comprises at least one polybutadiene (butadiene rubber), preferably in amounts of 2 to 100 phr, and according to one particularly advantageous embodiment of the invention to 50 phr, very preferably 10 to 25 phr. Particularly good abrasion and tensile properties of the rubber mixture of the invention are achieved in this way, in conjunction with a low hysteresis loss.

According to one particularly advantageous embodiment of the invention, the rubber mixture comprises at least one styrene-butadiene rubber (SBR), preferably in amounts of 2 to 100 phr, and according to one particularly advantageous embodiment of the invention 25 to 80 phr, very preferably 60 to 85 phr. Good processability in conjunction with low hysteresis loss, and also good abrasion and tensile properties, are achieved in this way on the part of the rubber mixture of the invention. The SBR in this case is preferably an SSBR, producing optimized hysteresis properties.

According to one particularly advantageous embodiment of the invention, the rubber mixture comprises a polymer blend of the stated rubbers NR, BR and SBR, preferably SSBR, and does so preferably in the respectively stated quantities in all conceivable combinations, with the sum of all the rubbers present making 100 phr.

In one particularly advantageous embodiment, the rubber mixture comprises 5 to 30 phr of at least one natural polyisoprene and/or at least one synthetic polyisoprene and 25 to 80 phr of at least one styrene-butadiene rubber and 5 to 50 phr of at least one butadiene rubber.

The natural and/or synthetic polyisoprene of all embodiments may be either cis-1,4-polyisoprene or 3,4-polyisoprene. Preference is given, however, to the use of cis-1,4-polyisoprenes with a cis-1,4 content >90% by weight. Firstly, it is possible to obtain such a polyisoprene by stereospecific polymerization in solution with Ziegler-Natta catalysts or using finely divided lithium alkyls. Secondly, natural rubber (NR) is one such cis-1,4-polyisoprene, for which the cis-1,4 content in the natural rubber is greater than 99% by weight.

In addition, a mixture of one or more natural polyisoprenes with one or more synthetic polyisoprenes is also conceivable.

If the rubber mixture of the invention includes butadiene rubber (i.e. BR, polybutadiene), the type of rubber in question may comprise any of the types known to the skilled person. These include so-called high-cis and low-cis types, wherein polybutadiene having a cis content of not less than 90% by weight is referred to as high-cis type and polybutadiene having a cis content of less than 90% by weight is referred to as low-cis type. An example of a low-cis polybutadiene is Li—BR (lithium-catalysed butadiene rubber) having a cis content of 20% to 50% by weight. A high-cis BR achieves particularly good abrasion properties and low hysteresis of the rubber mixture.

The one or more polybutadienes employed may be end group-modified with modifications and functionalizations and/or functionalized along the polymer chains. The modification may be a modification having hydroxyl groups and/or ethoxy groups and/or epoxy groups and/or siloxane groups and/or amino groups and/or aminosiloxane and/or carboxyl groups and/or phthalocyanine groups and/or silane-sulfide groups. However, further modifications known to those skilled in the art, also known as functionalizations, are also suitable. Metal atoms may be a constituent of such functionalizations.

In the case where at least one styrene-butadiene rubber (styrene-butadiene copolymer) is present in the rubber mixture, this may be either solution-polymerized styrene-butadiene rubber (SSBR) or emulsion-polymerized styrene-butadiene rubber (ESBR), a mixture of at least one SSBR and at least one ESBR also being employable. The terms "styrene-butadiene rubber" and "styrene-butadiene copolymer" are used synonymously in the context of the present invention.

The employed styrene-butadiene copolymer may be end group-modified and/or functionalized along the polymer chains with the modifications and functionalizations recited above for the polybutadiene.

Preferably, the rubber mixture contains 30 to 300 phr, more preferably 30 to 250 phr, of at least one filler. The filler may comprise all conceivable fillers for rubber mixtures, such as, in particular, reinforcing fillers such as, preferably, silica and/or carbon black and/or other reinforcing fillers.

Further optionally reinforcing fillers are, for example, carbon nanotubes (CNT), including discrete CNTs, so-called hollow carbon fibres (HCF) and modified CNTs containing one or more functional groups, such as hydroxyl, carboxyl and carbonyl groups, graphite and graphenes, and so-called "carbon-silica dual-phase fillers".

Moreover, the rubber mixture of the invention may comprise non-reinforcing fillers. The non-reinforcing fillers for the purposes of the present invention include preferably aluminosilicates, kaolin, chalk, starch, magnesium oxide, titanium dioxide or rubber gels, and also fibres (such as, for example, aramid fibres, glass fibres, carbon fibres, cellulose fibres).

According to one preferred embodiment of the invention, the rubber mixture comprises at least one silica, preferably in amounts of 10 to 300 phr, more preferably 30 to 250 phr, very preferably 50 to 200 phr.

According to one particularly advantageous embodiment of the invention, the rubber mixture contains 60 to 200 phr, preferably 80 to 150 phr, of at least one silica.

In a preferred embodiment, the rubber mixture of the invention is free of carbon black, i.e. contains 0 phr of carbon black.

According to another preferred embodiment of the invention, the rubber mixture comprises at least one carbon black, preferably in amounts of 0.1 to 100 phr, more preferably 1 to 50 phr, very preferably 5 to 30 phr, in turn preferably 5 to 15 phr.

The silica can be a type of silica which is known to those skilled in the art and is suitable as filler for tire rubber mixtures. However, particular preference is given to using a finely divided, precipitated silica which has a nitrogen surface area (BET surface area) (in accordance with DIN ISO 9277 and DIN 66132) of from 35 to 400 $m^2/g$, preferably from 35 to 350 $m^2/g$, particularly preferably from 85 to 320 $m^2/g$ and very particularly preferably from 120 to 235 $m^2$ g, and a CTAB surface area (in accordance with ASTM D 3765) of from 30 to 400 $m^2/g$, preferably from 30 to 330 $m^2/g$, particularly preferably from 80 to 300 $m^2/g$ and very particularly preferably from 110 to 230 $m^2/g$. Such silicas lead, for example in rubber mixtures for tire treads, to particularly good physical properties of the vulcanizates. In addition, advantages can arise in processing of the mixture as a result of a reduction in the mixing time while maintaining the same product properties that lead to improved productivity. Silicas used may thus, for example, be either those of the Ultrasil@VN3 type (trade name) from Evonik or highly dispersible silicas known as HD silicas (e.g. Zeosil® 1165 MP from Solvay).

Where at least two different silicas, differing, for example, in their BET surface area, are present in the rubber mixture of the invention, the quantity figures stated always refer to the total amount of all silicas present.

In the context of the present invention all carbon black types known to the skilled person are conceivable in principle. However, it is preferable to employ a carbon black having an iodine adsorption number according to ASTM D 1510 of 20 to 180 g/kg, more preferably to 140 g/kg, and a DBP number according to ASTM D 2414 of 30 to 200 mL/100 g, preferably 90 to 180 mL/100 g, particularly preferably 110 to 180 mL/100 g. A particularly suitable carbon black for the purposes of the present invention is, for example, a carbon black of ASTM type N339 having an iodine adsorption number of 90 g/kg and a DBP number of 120 mL/100 g.

To improve processability and to attach the silica and any other polar fillers present to the diene rubber, silane coupling agents may be employed in rubber mixtures. One or more different silane coupling agents may be employed in combination with one another here. The rubber mixture may thus comprise a mixture of different silanes.

The silane coupling agents react with the surface silanol groups of the silica or other polar groups during the mixing of the rubber or of the rubber mixture (in situ) or in the manner of a pretreatment (premodification) even before addition of the filler to the rubber. As silane coupling agents, it is possible to use all silane coupling agents which are known to those skilled in the art for use in rubber mixtures. Such coupling agents known from the prior art are bifunctional organosilanes which have at least one alkoxy, cycloalkoxy or phenoxy group as leaving group on the silicon atom and have, as other functionality, a group which can, optionally after dissociation, undergo a chemical reaction with the double bonds of the polymer. The latter group may, for example, be the following chemical groups:
—SCN, —SH, —NH$_2$ or —S$_x$— (with x=2 to 8).

For instance, silane coupling agents used may, for example, be 3-mercaptopropyltriethoxysilane, 3-thiocyanatopropyltrimethoxysilane or 3,3'-bis(triethoxysilylpropyl) polysulfides having 2 to 8 sulfur atoms, e.g. 3,3'-bis(triethoxysilylpropyl) tetrasulfide (TESPT), the corresponding disulfide (TESPD), or else mixtures of the sulfides having 1 to 8 sulfur atoms with different contents of the various sulfides. TESPT can, for example, also be added as a mixture with industrial carbon black (tradename X50S@ from Evonik).

Preference is given to using a silane mixture which contains 40% to 100% by weight of disulfides, more preferably 55% to 85% by weight of disulfides and most preferably 60% to 80% by weight of disulfides. A mixture of this kind is available, for example, under the Si 266@ trade name from Evonik, which is described, for example, in DE 102006004062 A1.

Blocked mercaptosilanes, as are known, for example, from WO 99/09036, can also be used as silane coupling agent. It is also possible to use silanes as described in WO 2008/083241 A1, WO 2008/083242 A1, WO 2008/083243 A1 and WO 2008/083244 A1. It is possible to use, for example, silanes which are marketed under the NXT name (e.g. 3-(octanoylthio)-1-propyltriethoxysilane) in a number of variants from Momentive, USA, or those which are marketed under the name VP Si 363@ by Evonik Industries.

It is also conceivable that one of the abovementioned mercaptosilanes, especially 3-mercaptopropyltriethoxysilane, is used in combination with processing aids (that are listed below), especially PEG carboxylates.

In a preferred embodiment of the invention, the rubber mixture comprises a combination of 3-mercaptopropyltriethoxysilane and PEG carboxylates, which results in particularly good properties, especially with regard to the technical problem to be solved, and a good level of properties overall with regard to the other properties.

In addition, the rubber mixture may contain further activators and/or agents for the binding of fillers, in particular carbon black. This may be, for example, the compound S-(3-aminopropyl)thiosulfiric acid disclosed in EP 2589619 A1 for example and/or metal salts thereof, whereby very good physical properties of the rubber mixture, especially in combination with at least one carbon black as filler, are achieved.

The recited silanes and activators are added in the production of the rubber mixture preferably in at least one preliminary mixing stage.

According to one particularly preferred embodiment, the rubber mixture comprises at least one silane coupling agent as described above, not counting the liquid polymer A which is organosilicon-modified according to formula I), for the purposes of the present invention. According to this preferred embodiment of the invention, therefore, the rubber mixture comprises the liquid polymer A and at least one silane coupling agent (silane).

The at least one silane, according to one preferred embodiment of the invention, comprises at least one blocked and/or at least one unblocked mercaptosilane.

By unblocked mercaptosilanes are meant silanes which have an —S—H group, i.e. a hydrogen atom on the sulfur atom. By blocked mercaptosilanes are meant silanes which have an S-PG group, where PG is the abbreviation for a protective group on the sulfur atom. Preferred protective groups, as set out below, are acyl groups.

The expression "blocked and/or unblocked mercaptosilane" means that the rubber mixture of the invention may comprise alternatively a blocked silane, an unblocked silane or a mixture of blocked and unblocked silane.

To the skilled person, it is clear that this detail relates to the initial state of the constituents of the sulfur-crosslinkable rubber mixture, and that the protective groups are eliminated during the mixing process and/or during vulcanization, and the respective sulfur atoms react chemically.

The blocked and/or unblocked mercaptosilane preferably has the general empirical formula IV):

$$(R^4)_3Si—Z—S—R^5 \qquad \qquad IV)$$

where the radicals $R^4$ may be identical to or different from one another within one molecule, and are alkoxy groups having 1 to 10 carbon atoms, and
where $R^5$ is an acyl group having 1 to 20 carbon atoms or is a hydrogen atom, and
where Z is an alkyl group having 1 to 10 carbon atoms.
S is the abbreviation for sulfur, and Si for silicon.

Blocked mercaptosilanes carry, on the sulfur atom, a protective group, in the present case, in formula IV), the group $R^5$, and hence are also called "protected mercaptosilanes".

According to one preferred embodiment of the invention, the mercaptosilane comprises the blocked mercaptosilane 3-octanoylthio-1-propyltriethoxysilane, meaning that in formula IV) stated above, all radicals $R^4$ are ethoxy (OEt) and Z is a propyl group and $R^5$ is an octanoyl group.

Surprisingly, the combination of the above-described modified liquid polybutadiene with a blocked and/or unblocked, preferably blocked mercaptosilane, more particularly 3-octanoylthio-1-propyltriethoxysilane, produces a synergistic interaction in terms of the technical object to be achieved.

Furthermore, the rubber mixture may comprise customary additives in customary parts by weight, which are added preferably in at least one primary mixing stage in the course of production of the mixture. These additives include
a) ageing inhibitors, such as N-phenyl-N'-(1,3-dimethylbutyl)-p-phenylenediamine (6PPD), N,N'-diphenyl-p-phenylenediamine (DPPD), N,N'-ditolyl-p-phenylenediamine (DTPD), N-isopropyl-N'-phenyl-p-phenylenediamine (IPPD), 2,2,4-trimethyl-1,2-dihydroquinoline (TMQ),
b) activators, for example zinc oxide and fatty acids (e.g. stearic acid) and/or other activators, such as zinc complexes, for example zinc ethylhexanoate,
c) waxes,
d) hydrocarbon resins, such as, optionally, tackifier resins in particular, e) masticating aids, for example 2,2'-dibenzamidodiphenyl disulfide (DBD) and f) process assistants, such as, in particular, fatty acid esters and metal soaps, such as zinc soaps and/or calcium soaps, for example, g) plasticizers.

In one preferred embodiment of the invention, it is advantageous if the rubber mixture comprises at least one plasticizer (in addition to the stated liquid polymer A), in which case the total amount of additional plasticizer is preferably 1 to 90 phr, more preferably 5 to 70 phr, most preferably 15 to 60 phr. Especially in combination with the abovementioned constituents, this results in particularly good processability of the rubber mixture, especially of the extrudates prior to crosslinking, with simultaneously good rolling resistance indicators.

The plasticizers used in the context of the present invention include all polar and apolar plasticizers known to those skilled in the art, such as aromatic, naphthenic or paraffinic mineral oil plasticizers, for example MES (mild extraction solvate) or RAE (residual aromatic extract) or TDAE (treated distillate aromatic extract), or rubber-to-liquid oils (RTL) or biomass-to-liquid oils (BTL), preferably having a polycyclic aromatics content of less than 3% by weight according to method IP 346, or triglycerides, such as rapeseed oil, or factices or hydrocarbon resins or additional liquid polymers that do not correspond to the diene polymer A and whose average molecular weight (determination by GPC=gel permeation chromatography, in accordance with BS ISO 11344:2004) is in particular between 500 and 20 000 g/mol, substituted alkyl esters such as dibutylmethylene dithiodiacetate, and phosphate esters such as tris(2-ethylhexyl) phosphate, for example. If additional liquid polymers are used as plasticizers in the rubber mixture of the invention, these are likewise not counted as rubber in the calculation of the composition of the polymer matrix. The plasticizer is preferably selected from the group consisting of the abovementioned plasticizers.

With particular preference the plasticizer is selected from the group consisting of hydrocarbon resins, liquid polymers and mineral oils. When mineral oil is used, it is preferably selected from the group consisting of DAE (distilled aromatic extracts) and/or RAE (residual aromatic extracts) and/or TDAE (treated distilled aromatic extracts) and/or MES (mild extracted solvents) and/or naphthenic oils.

According to one preferred embodiment of the invention, the rubber mixture comprises at least one mineral oil plasticizer, preferably at least TDAE and/or RAE as plasticizer. This results in particularly good processing qualities, not least a high capacity for mixing on the part of the rubber mixture.

In one preferred embodiment of the invention, the rubber mixture comprises at least one further liquid polymer as plasticizer.

In one preferred embodiment of the invention, the rubber mixture comprises at least one hydrocarbon resin as plasticizer.

It will be clear to those skilled in the art that hydrocarbon resins are polymers constructed from monomers, wherein the hydrocarbon resin is formally constructed from derivatives of the monomers by linkage of the monomers to one another. In the context of the present invention, however, these hydrocarbon resins do not count as rubbers. The term "hydrocarbon resins" encompasses in the context of the present application resins which comprise carbon atoms and hydrogen atoms and may comprise optionally heteroatoms, such as in particular oxygen atoms. The hydrocarbon resin may be a homopolymer or a copolymer. The term "homopolymer" is to be understood as meaning in the present application a polymer which, according to Römpp Online Version 3.28, "has formed from monomers of only one type". The monomers may be all monomers of hydrocarbon resins that are known to those skilled in the art, such as aliphatic $C_5$ monomers, further unsaturated compounds that can be cationically polymerized, comprising aromatics and/or terpenes and/or alkenes and/or cycloalkenes.

In a preferred embodiment of the invention, the hydrocarbon resin is selected from the group consisting of aliphatic $C_5$ resins and hydrocarbon resins formed from alpha-methylstyrene and styrene.

The hydrocarbon resin preferably has an ASTM E 28 (ring and ball) softening point of 10 to 180° C., more preferably of 60 to 150° C., very preferably of 80 to 99° C. Moreover, the hydrocarbon resin preferably has a molecular weight Mw of 500 to 4000 g/mol, preferably of 1300 to 2500 g/mol.

The proportion of the total amount of further additives is 3 to 150 phr, preferably 3 to 100 phr and more preferably 5 to 80 phr. Zinc oxide (ZnO) may be included in the overall proportion of the further additives. This may be any type of zinc oxide known to those skilled in the art, for example ZnO granulate or powder. The conventionally used zinc oxide generally has a BET surface area of less than 10 $m^2/g$. However, it is also possible to use a zinc oxide having a BET surface area of 10 to 100 $m^2/g$, for example so-called "nano-zinc oxides".

Particularly when the rubber mixture of the invention is used for the internal components of a tire or an industrial rubber article which come into direct contact with strengthening elements present, a suitable bonding system, often in the form of tackifying resins, is generally also added to the rubber mixture.

The vulcanization is preferably carried out in the presence of sulfur and/or sulfur donors and with the aid of vulcanization accelerators, with some vulcanization accelerators simultaneously being able to act as sulfur donors.

Sulfur and/or further sulfur donors and also one or more accelerators are added to the rubber mixture in the last mixing step. The accelerator is selected from the group consisting of thiazole accelerators and/or mercapto accelerators and/or sulfenamide accelerators and/or thiocarbamate accelerators and/or thiuram accelerators and/or thiophosphate accelerators and/or thiourea accelerators and/or xanthogenate accelerators and/or guanidine accelerators.

Preference is given to using at least one sulfenamide accelerator selected from the group consisting of N-cyclohexyl-2-benzothiazolesulfenamide (CBS) and/or N,N-dicyclohexylbenzothiazole-2-sulfenamide (DCBS) and/or benzothiazyl-2-sulfenomorpholide (MBS) and/or N-tert-butyl-2-benzothiazylsulfenamide (TBBS).

Sulfur-donating substances used may be any sulfur-donating substances known to those skilled in the art. If the rubber mixture comprises a sulfur-donating substance, it is preferably selected from the group comprising, for example, thiuram disulfides, for example tetrabenzylthiuram disulfide (TBzTD) and/or tetramethylthiuram disulfide (TMTD) and/or tetraethylthiuram disulfide (TETD), and/or thiuram tetrasulfides, for example dipentamethylenethiuram tetrasulfide (DPTT), and/or dithiophosphates, for example DipDis (bis(diisopropyl)thiophosphoryl disulfide) and/or bis(O,O-2-ethylhexylthiophosphoryl) polysulfide (e.g. Rhenocure SDT 50@, Rheinchemie GmbH) and/or zinc dichloryldithiophosphate (e.g. Rhenocure ZDTS@, Rheinchemie GmbH)

and/or zinc alkyldithiophosphate, and/or 1,6-bis(N,N-dibenzylthiocarbamoyldithio)hexane and/or diaryl polysulfides and/or dialkyl polysulfides.

Further network-forming systems as obtainable, for example, under the Vulkuren®, Duralink® or Perkalink® trade names or network-forming systems as described in WO 2010/049216 A2 can also be used in the rubber mixture. This system contains a vulcanizing agent which crosslinks with a functionality of greater than four and at least one vulcanization accelerator.

The required amount of further sulfur in the form of elemental sulfur and/or further sulfur donors depends on the field of use of the respective rubber mixture. The respective amounts to be added are known to those skilled in the art. When elemental sulfur is added, the amounts in the case of a rubber mixture for the bead of vehicle tires are, for example, from 0 to 5 phr. In the case of treads of vehicle tires, which generally have a lower sulfur content than the bead, the amount of elemental sulfur to be added is preferably 0 to 4 phr.

In addition, vulcanization retarders may be present in the rubber mixture.

The terms "vulcanized" and "crosslinked" are used synonymously in the context of the present invention.

A further subject of the present invention is a method for producing the sulfur-crosslinkable rubber mixture of the invention, wherein first of all a base mixture with all the constituents apart from the vulcanization system is produced in one or more mixing stages. The final mixture is produced by adding the vulcanization system in a final mixing stage. The final mixture is subjected to further processing and brought into the appropriate shape for example by an extrusion procedure or calendering. This is followed by further processing by vulcanization, wherein owing to the vulcanization system added in the context of the present invention sulfur crosslinking takes place.

The above-described rubber mixture according to the invention is particularly suitable for use in vehicle tires, especially pneumatic vehicle tires. Conceivable in principle here is application in all tire components, especially in a tread, more particularly in the cap of a tread with cap/base construction, as already described above.

For use in vehicle tires the mixture as a finished mixture prior to vulcanization is preferably brought into the shape of a tread and during production of the green vehicle tire is applied in the known manner.

The production of the rubber mixture according to the invention for use as sidewall or other body mixture in vehicle tires is effected as already described. The difference is in the shaping after the extrusion procedure/the calendering of the mixture. The thus obtained shapes of the as yet unvulcanized rubber mixture for one or more different body mixtures then serve for the construction of a green tire.

"Body mixture" refers here to the rubber mixtures for the other components of a tire, such as essentially separating plate, inner liner (inner layer), core profile, breaker belt, shoulder, breaker belt profile, carcass, bead reinforcement, bead profile, flange profile and bandage. For use of the rubber mixture according to the invention in drive belts and other belts, especially in conveyor belts, the extruded, as yet unvulcanized mixture is brought into the appropriate shape and often provided at the same time or subsequently with strength members, for example synthetic fibres or steel cords. This usually affords a multilayer construction consisting of one and/or more plies of rubber mixture, one and/or more plies of identical and/or different strength members and one and/or more further plies of the same and/or another rubber mixture.

The invention will now be illustrated in more detail with the aid of comparative examples and working examples which are summarized in Table 1.

The comparative mixture is labelled C, the inventive mixture I.

The mixture was produced by the process customary in the rubber industry under standard conditions in two stages in an internal mixer, wherein all of the constituents apart from the vulcanization system (sulfur and vulcanization-influencing substances) were mixed first of all in the first mixing stage (primary mixing stage). By addition of the vulcanization system in the second stage (completion mixing stage), the finished mixture was produced, with mixing at 90 to 120° C.

All mixtures were used to produce test specimens by vulcanization after 20 minutes under pressure at 160° C. and these test specimens were used to determine material properties typical for the rubber industry with the test methods specified hereinafter.

Furthermore, tire tests were conducted, both in Comparative Example C1 and in Inventive Example I1, with the mixture in each case as tread cap. Test methods applied were as follows:
  Wet braking: ABS braking, braking distance from 80 km/h, wet asphalt, low p
  Dry braking: ABS braking, braking distance from 100 km/h, dry asphalt, high p
  Rolling resistance: according to ISO 28580
The values determined were converted into performance, with the comparative mixture C1 being standardized to 100% performance for each property tested. All other mixture performances are based on this comparative mixture C1. In these FIGURES, values <100% denote a deterioration in the properties, whereas values >100% represent an improvement.

Substances Used
  a) High-cis Nd—BR
  b) SLR3402, Trinseo
  c) Liquid polybutadiene, but not inventive, possessing siloxane functionalization at both chain ends and therefore being labelled A*
  d) Polymer A: polybutadiene modified (terminally) at only a maximum of one chain end, modification as per formula I), with $R^1$, $R^2$ and $R^3$=ethoxy groups, X=divalent linear propyl group, Mw=5400 g/mol, Mw/Mn=1.05, vinyl fraction=65 mol %, glass transition temperature=−50° C., degree of functionalization=0.97; production as described below;
  e) Zeosol 1165 MP, Rhodia
  f) TDAE
  g) NXT, Momentive: 3-(Octanoylthio)-1-propyltriethoxysilane
  h) Zinc oxide, stearic acid, ageing inhibitor, ozone protection wax Production of Polymer A used d)

A carefully dried 5 L autoclave was flushed with nitrogen. Then 1680 g of hexane, 6.2 g of N,N,N',N'-tetramethylethylenediamine and 122 g of n-butyllithium (15.6% by mass in hexane solution) were placed into the autoclave.

When the temperature had been increased to 50° C., 850 g of butadiene were added gradually with stirring and with monitoring and maintenance of the temperature at 50° C. One minute after the addition of all of the butadiene amount, 14.5 g of ethylene oxide were added, after which stirring was continued for 60 minutes. The polymerization reaction was then ended. After this, 11.5 g of methanol were added, to give a polymer solution.

Water at a temperature of 60° C. was added to the resulting polymer solution, until the polymer solution/water volume ratio was 2/1. This was followed by stirring for 30 minutes, after which the mixture was left to stand at rest for 30 minutes. Following separation of the aqueous phase and the polymer-containing phase, the aqueous phase was removed.

This washing procedure was repeated until the aqueous phase and the polymer-containing phase gave a pH of 6 to 8, for removal of catalyst residues. The resulting washed polymer solution was heated at 160° C. for 8 hours to remove the solvent. This gave, as a precursor, a linear, hydroxyl-group-modified diene polymer (polybutadiene).

Subsequently, 700 g of the resulting linear hydroxyl-group-modified diene polymer were introduced into a 1 L autoclave together with 66.9 g of 3-isocyanatopropyltriethoxysilane and 14 mg of dibutyltin dilaurate.

The mixture was stirred at 60° C. for 3 hours in order to achieve the desired chemical reaction of the functional group. By this means, the above-described polymer A $^{d)}$ was obtained.

|  | Unit | C1 | I1 |
|---|---|---|---|
| Constituents |  |  |  |
| NR TSR | phr | 15 | 15 |
| BR $^{a)}$ | phr | 20 | 20 |
| SSBR $^{b)}$ | phr | 65 | 65 |
| Liq. polymer A* $^{c)}$ | phr | 20 | — |
| Liq. polymer A $^{d)}$ | phr | — | 20 |
| Carbon black N121 | phr | 8 | 8 |
| Silica $^{e)}$ | phr | 120 | 120 |
| Plasticizer $^{f)}$ | phr | 63 | 46 |
| Silane $^{g)}$ | phr | 12 | 12 |
| Additives $^{h)}$ | phr | 14 | 14 |
| Accelerator | phr | 4.5 | 4.5 |
| Sulfur | phr | 0.6 | 0.6 |
| Physical properties |  |  |  |
| Shore hardness A | Shore A | 56 | 52 |
| Rebound resilience at RT | % | 33 | 26 |
| Elongation at break | % | 613 | 717 |
| Tensile strength | MPa | 13 | 13 |
| Tire results |  |  |  |
| Rolling resistance | % | 100 | 98 |
| Wet braking | % | 100 | 103 |
| Dry braking | % | 100 | 103 |

As is apparent from Table 1, the inventive rubber mixture and, respectively, the inventive vehicle tire show an improvement in the conflict of objectives between rolling resistance and wet braking. At the same time, surprisingly, the dry braking is improved significantly at +3% relative to C1 (containing a liquid polymer from the prior art). This was not necessarily the expectation, especially since the rubber mixture I1 is less hard than that of C1. With a softer mixture, the expectation would have been of a deterioration in the dry braking characteristics.

The invention claimed is:

1. A sulfur crosslinkable rubber mixture comprising at least the following ingredients:
a natural polyisoprene rubber;
at least one styrene-butadiene rubber which is not end group-modified;
at least one polybutadiene rubber; and,
at least one liquid linear modified polybutadiene polymer A, which is modified with a functional group according to formula (I) at only one chain end, wherein the number of functional groups per molecule is on average from 0.8 to less than 1, wherein some polymer chains of the at least one liquid linear modified polybutadiene polymer A are entirely unmodified, and wherein polybutadiene A of the at least one liquid linear modified polybutadiene polymer A is composed of 100 mol % of butadiene monomers:

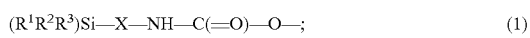

$(R^1R^2R^3)Si—X—NH—C(=O)—O—;$     (1)

wherein $R^1$, $R^2$ and $R^3$ are independently selected from methoxy groups, ethoxy groups, phenoxy groups, methyl groups, ethyl groups and phenyl groups, wherein each at least one of the $R^1$, $R^2$ and $R^3$ is a methoxy group, an ethoxy group or a phenoxy group, and wherein X is a divalent alkyl group with 1 to 6 carbon atoms; and,
provided the at least one liquid linear modified polybutadiene polymer A is not a terminally amine-modified liquid polybutadiene.

2. The sulfur-crosslinkable rubber mixture according to claim 1 further comprising from 10 to 300 phr of at least one silica.

3. The sulfur-crosslinkable rubber mixture according to claim 1 consisting of the natural polyisoprene rubber, the at least one styrene-butadiene rubber, the at least one polybutadiene rubber, and the at least one liquid linear modified polybutadiene polymer A as rubbers in the mixture.

4. The sulfur-crosslinkable rubber mixture according to claim 1, wherein X is a divalent alkyl group having 2 to 4 carbon atoms, and wherein at least one of the $R^1$, $R^2$ and $R^3$ is a methoxy group or a phenoxy group.

5. The sulfur-crosslinkable rubber mixture according to claim 1, wherein the at least one liquid linear modified polybutadiene polymer A has a weight average Mw of the molecular weight according to GPC of 500 to 15,000 g/mol.

6. The sulfur-crosslinkable rubber mixture according to claim 1, wherein the at least one liquid linear modified polybutadiene polymer A is present in an amount of from 1 to 80 phr.

7. The sulfur-crosslinkable rubber mixture according to claim 1, wherein the at least one styrene-polybutadiene rubber is selected from the group consisting of solution polymerized styrene-butadiene rubber (SSBR) and emulsion polymerized styrene-butadiene rubber (ESBR).

8. The sulfur-crosslinkable rubber mixture according to claim 1 further comprising at least one silane, wherein the at least one silane is at least one blocked and/or at least one unblocked mercaptosilane.

9. The sulfur-crosslinkable rubber mixture according to claim 1 as incorporated into at least one component of a vehicle tire.

10. The sulfur-crosslinkable rubber mixture according to claim 1 as incorporated into technical rubber articles.

* * * * *